(12) United States Patent
Sun

(10) Patent No.: US 11,009,946 B2
(45) Date of Patent: May 18, 2021

(54) PUPIL CENTER POSITIONING APPARATUS AND METHOD, AND VIRTUAL REALITY DEVICE

(71) Applicant: BOE TECHNOLOGY GROUP CO., LTD., Beijing (CN)

(72) Inventor: Gaoming Sun, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/646,929

(22) PCT Filed: Apr. 10, 2019

(86) PCT No.: PCT/CN2019/082026
§ 371 (c)(1),
(2) Date: Mar. 12, 2020

(87) PCT Pub. No.: WO2019/205937
PCT Pub. Date: Oct. 31, 2019

(65) Prior Publication Data
US 2020/0278744 A1 Sep. 3, 2020

(30) Foreign Application Priority Data
Apr. 24, 2018 (CN) .......................... 201810375282.1

(51) Int. Cl.
*G09G 5/00* (2006.01)
*G06F 3/01* (2006.01)
(Continued)

(52) U.S. Cl.
CPC .............. *G06F 3/013* (2013.01); *G06F 17/12* (2013.01); *G06F 17/16* (2013.01); *G06K 9/00604* (2013.01)

(58) Field of Classification Search
CPC .......... G06F 3/013; G06F 17/12; G06F 17/16; G06K 9/00604; G06K 9/00597
(Continued)

(56) References Cited

U.S. PATENT DOCUMENTS

| 2009/0141995 A1 | 6/2009 | Chakraborty et al. |
| 2019/0147216 A1* | 5/2019 | Yang .......................... G06T 1/60 |
| | | 382/103 |

FOREIGN PATENT DOCUMENTS

| CN | 101266645 A | 9/2008 |
| CN | 103067662 A | 4/2013 |

(Continued)

OTHER PUBLICATIONS

International Search Report received for PCT Patent Application No. PCT/CN2019/082026, dated Jul. 17, 2019, 5 pages (2 pages of English Translation and 3 pages of Original Document).
(Continued)

*Primary Examiner* — Jennifer T Nguyen
(74) *Attorney, Agent, or Firm* — Womble Bond Dickinson (US) LLP

(57) ABSTRACT

The embodiments of the disclosure provide a pupil center positioning apparatus and method, and a virtual reality device. The pupil center positioning apparatus may comprise: a matrix operation circuit configured to obtain a set of linear normal equations according to received N boundary point coordinates of a pupil area, N being a positive integer greater than 5; a parameter operation circuit configured to obtain parameters of an elliptic equation employing the Cramer's Rule according to the set of linear normal equations; and a coordinate operation circuit configured to obtain the center coordinate of the pupil area according to the parameters of the elliptic equation.

14 Claims, 3 Drawing Sheets

(51) Int. Cl.
*G06F 17/12* (2006.01)
*G06F 17/16* (2006.01)
*G06K 9/00* (2006.01)

(58) Field of Classification Search
USPC .............................................. 345/8; 348/78
See application file for complete search history.

(56) References Cited

FOREIGN PATENT DOCUMENTS

| | | |
|---|---|---|
| CN | 106774863 A | 5/2017 |
| CN | 107833251 A | 3/2018 |
| CN | 107844736 A | 3/2018 |
| CN | 108427926 A | 8/2018 |
| CN | 108572735 A | 9/2018 |

OTHER PUBLICATIONS

Office Action received for Chinese Patent Application No. 201810375282.1, dated Dec. 4, 2019, 12 pages (6 pages of English Translation and 6 pages of Office Action).

Office Action received for Chinese Patent Application No. 201810375282.1, dated Jun. 17, 2020, 10 pages (6 pages of English Translation and 4 pages of Office Action).

* cited by examiner

PUPIL CENTER POSITIONING APPARATUS AND METHOD, AND VIRTUAL REALITY DEVICE

CROSS REFERENCE TO RELATED APPLICATIONS

The present application is a 35 U.S.C. 371 national stage application of PCT International Application No. PCT/CN2019/082026, filed on Apr. 10, 2019, which claims the benefit of Chinese Patent Application No. 201810375282.1, filed on Apr. 24, 2018, the entire disclosures of which are incorporated herein by reference.

TECHNICAL FIELD

The disclosure relates to the field of eye control technology, and in particular, to a pupil center positioning apparatus and method, and a virtual reality device.

BACKGROUND

In recent years, virtual reality (VR)/augmented reality (AR) technologies have been gradually applied to display, game, medical and other fields. With the development of technology, people's expectations for VR/AR are higher and higher, the interaction approach of realizing perspective transformation by rotation of the head may no longer bring people a satisfactory product experience, and therefore, the eye tracking technology has gradually become an important technology that promotes the VR/AR device experience. The eye tracking technology is an intelligent human-machine interaction technology for controlling a machine with eye movement, and it may complete all the operations with eye "look", which not only may free both hands, but is also the fastest and humanized control mode. The eye tracking technology is introduced into the VR/AR field, which may not only meet the needs of high-definition rendering, but also greatly improve the interaction experience of a VR/AR device. In the interaction of a user with a VR/AR user interface via eyes, it may be possible to directly control a menu and trigger an operation with eyes, and hence enable people to get rid of unnatural head operations.

SUMMARY

According to an aspect of the disclosure, there is provided a pupil center positioning apparatus. The pupil center positioning apparatus may include: a matrix operation circuit configured to obtain a set of linear normal equations according to received N boundary point coordinates of a pupil area, N being a positive integer greater than 5; a parameter operation circuit configured to obtain parameters of an elliptic equation employing the Cramer's Rule according to the set of linear normal equations; and a coordinate operation circuit configured to obtain the center coordinate of the pupil area according to the parameters of the elliptic equation.

In an embodiment, the matrix operation circuit may include: an array cache configured to receive the N boundary point coordinates and cache them in the form of an array; a coefficient matrix processor configured to successively read out the coordinate of each boundary point from the array cache and obtain a set of linear over-determined equations $G1 \times X = H1$, wherein G1 is a first coefficient matrix of N×5, X is a variable matrix of 5×1, and H1 is a first constant term matrix of N×1; a transposed matrix processor configured to obtain a transposed matrix $G1^T$ of the first coefficient matrix G1; and a matrix multiplier configured to multiply the transposed matrix $G1^T$ with the first coefficient matrix G1 and the first constant term matrix H1, respectively, to obtain a set of linear normal equations $G2 \times X = H2$, wherein G2 is a second coefficient matrix of 5×5, and H2 is a second constant term matrix of 5×1.

In an embodiment, the transposed matrix processor may include: a first cache configured to obtain matrix elements of the first coefficient matrix G1 from the coefficient matrix processor; a multiplexer configured to obtain all the matrix elements from the first cache and interchange rows and columns for them; a second cache configured to obtain all the matrix elements after the interchange of rows and columns from the multiplexer to form the transposed matrix $G1^T$; a counter coupled to the first cache, the multiplexer and a marker, respectively, and configured to increment a count in address mapping; and the marker coupled to the counter and the second cache, respectively, and configured to control individual matrix elements to be outputted to the second cache according to the counter.

In an embodiment, the parameter operation circuit may include: a state controller coupled to a coefficient matrix memory, a multi-way selector and a parameter calculator, respectively; the coefficient matrix memory configured to obtain the second coefficient matrix G2 and the second constant term matrix H2 from the matrix operation circuit and store all the matrix elements of the second coefficient matrix G2 and the second constant term matrix H2; the multi-way selector configured to successively obtain parameter matrices composed of the second coefficient matrix G2 and the second constant term matrix H2 from the coefficient matrix memory according to the Cramer's Rule under the control of the state controller; and the parameter calculator configured to calculate the product of each of the parameter matrices and the second coefficient matrix G2 under the control of the state controller and obtain each parameter of the elliptic equation.

In an embodiment, N=10.

According to another aspect of the disclosure, there is provided a virtual reality device, which may include a pupil center positioning apparatus as described above.

According to still another aspect of the disclosure, there is provided a pupil center positioning method. The pupil center positioning method may include: obtaining a set of linear normal equations according to received N boundary point coordinates of a pupil area, N being a positive integer greater than 5; obtaining parameters of an elliptic equation employing the Cramer's Rule according to the set of linear normal equations; and obtaining the center coordinate of the pupil area according to the parameters of the elliptic equation.

In an embodiment, the obtaining a set of linear normal equations according to received N boundary point coordinates of a pupil area may include: receiving the N boundary point coordinates and caching them in the form of an array; successively reading out the coordinate of each boundary point and obtaining a set of linear over-determined equations $G1 \times X = H1$, wherein G1 is a first coefficient matrix of N×5, X is a variable matrix of 5×1, and H1 is a first constant term matrix of N×1; obtaining a transposed matrix $G1^T$ of the first coefficient matrix; and multiplying the transposed matrix $G1^T$ with the first coefficient matrix G1 and the first constant term matrix H1, respectively, to obtain a set of linear normal equations $G2 \times X = H2$, wherein G2 is a second coefficient matrix of 5×5, and H2 is a second constant term matrix of 5×1.

In an embodiment, the obtaining parameters of an elliptic equation employing the Cramer's Rule according to the set of linear normal equations may include: storing the matrix elements of the second coefficient matrix G2 and the second constant term matrix H2; successively obtaining parameter matrices composed of the second coefficient matrix G2 and the second constant term matrix H2 according to the Cramer's Rule; and calculating the product of each of the parameter matrices and the second coefficient matrix G2 and obtaining the parameters of the elliptic equation.

In an embodiment, N=10.

BRIEF DESCRIPTION OF THE DRAWINGS

The drawings are used to provide a further understanding of the technical solution of the disclosure, constitute part of the specification, are used together with the embodiments of this application to explain the technical solution of the disclosure, and do not constitute a limitation to the technical solution of the disclosure. The shape and size of an individual component in the drawings do not reflect the true ratio, and its purpose is simply to schematically illustrate the content of the disclosure.

DETAILED DESCRIPTION

In the following, specific implementations of the disclosure will be further described in detail in conjunction with the drawings and the embodiments. The following embodiments are used for illustrating the disclosure, but not for limiting the scope of the disclosure. It is noted that, in a case of no conflict, the embodiments in this application and the features in the embodiments may be arbitrarily combined with each other.

The eye tracking technology involves capturing an image of an eye in real time through a camera apparatus installed in front of the eye based on an image processing method, the image containing a high brightness spot, i.e., a purkinje image, formed on the cornea of the eye. When the eye gazes at a different position, the eye approximate to a ball rotates while the spot as a reference point does not move. After the position coordinate of the pupil center is obtained by data processing, by making use of the relationship between the position coordinate of the pupil center and the position coordinate of the spot, it may be possible to calculate the position of the current line-of-sight of the eye which falls on a display screen in front of the eye, and then operate the display screen, implementing a function such as human-machine interaction or gaze point rendering, etc. From this, accurate positioning of the position coordinate of the pupil center is the basis of the eye tracking technology.

In VR/AR devices supporting eye tracking known to the inventors, especially, in head-mounted VR/AR devices, pupil center positioning employs a hardware-implemented projection coordinate method. The projection coordinate method utilizes the gray-level information of the eye, and detects the abscissa and the ordinate of the pupil through the horizontal and vertical projections, respectively, thereby obtaining the position coordinate of the pupil center.

It has been found out by the inventors' research that the calculation accuracy of the projection coordinate method is low, it is greatly interfered by factors such as eyelashes, eyelids, etc., and its anti-interference ability is poor, which affects the experience of a user.

Embodiments of the disclosure provide a pupil center positioning apparatus and method based on hardware implementation, and a virtual reality device containing the pupil center positioning apparatus.

Of course, implementing any of the products or methods of the disclosure does not necessarily need to achieve all the advantages described above simultaneously. Other features and advantages of the disclosure will be elucidated in the subsequent specification embodiments, and become partially apparent from the specification embodiments, or be known by implementing the disclosure. The objects and other advantages of the embodiments of the disclosure may be achieved and obtained by structures pointed out specifically in the specification, the claims and the drawings.

Figure 1:
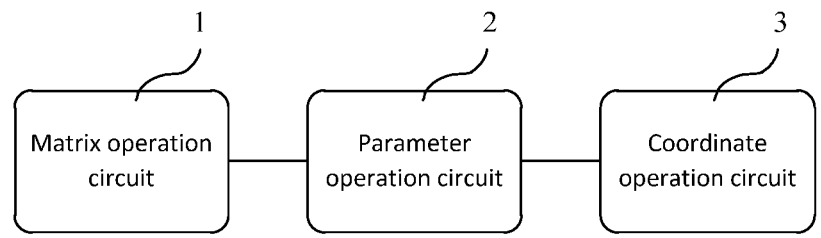
FIG. 1 is a structural diagram of a pupil center positioning apparatus according to an embodiment of the disclosure.

FIG. 1 is a structural diagram of a pupil center positioning apparatus according to an embodiment of the disclosure. As shown in FIG. 1, the main structure of a pupil center positioning apparatus based on hardware implementation comprises a matrix operation circuit 1, a parameter operation circuit 2, and a coordinate operation circuit 3 that are successively connected. The matrix operation circuit 1 is configured to obtain a set of linear normal equations according to received N boundary point coordinates of a pupil area, N being a positive integer greater than 5. The parameter operation circuit 2 is configured to obtain parameters of an elliptic equation employing the Cramer's Rule according to the set of linear normal equations. The coordinate operation circuit 3 is configured to obtain the center coordinate of the pupil area according to the parameters of the elliptic equation.

The embodiment of the disclosure provides a pupil center positioning apparatus based on hardware implementation. The pupil center positioning apparatus carries out pupil center positioning based on an ellipse fitting algorithm, and, as compared to the projection coordinate method, it not only increases the calculation accuracy and improves the anti-interference ability, but also facilitates hardware implementation and is integrated into a virtual reality device, its processing speed is higher, its processing time is shorter, and it uses less logic resources. In processing the multiple boundary points of the pupil area, the Cramer's Rule is employed to obtain the parameters of the elliptic equation, which, as compared to the LU Decomposition (Lower and Upper Decomposition) adopted in the related art, may effectively avoid error accumulation occurring in division calculation in the LU Decomposition, and further improve the calculation accuracy and the anti-interference ability.

In an embodiment of the disclosure, the N boundary point coordinates of the pupil area obtained by the matrix operation circuit 1 are outputted by a pupil area circuit (not shown in FIG. 1) at the front end. On the VR/AR device is arranged a camera apparatus, for example, a camera based on CCD or CMOS imaging elements, which captures an image of the eye in real time, the acquired eye image is transmitted to the pupil area circuit for preprocessing and boundary extraction processing, the pupil area is extracted and multiple boundary point coordinates of the pupil area are sent to the matrix operation circuit 1. In general, the preprocessing comprises gray-level conversion processing, filtering processing, and binarization processing, etc. Gray-level conversion processing is to perform gray-level conversion on a color image captured by the camera apparatus and convert RGB image data to e.g., 8-bit, gray-level image data. Filtering processing is to perform filtering processing on the gray-level image data to remove noise from the image. Binarization processing is to process an 8-bit, 256-grayscale image into an image with only two grayscales, 0 or 255, that is, convert a gray-level image to a black-and-white image. In a practical implementation, the preprocessing may further comprise processing such as boundary erosion and expansion, etc. Boundary erosion and expansion is to perform an open operation on binarized data, eliminate a small object and smooth the boundary of a larger object to make the boundary clear, and obtain binarized data with a clear boundary. Boundary extraction processing is to perform boundary extraction on the binarized data with a clear boundary and obtain boundary point coordinates of the pupil area in the image. Finally, N boundary points are chosen from all the boundary points of the pupil area, N being a positive integer greater than 5, for example, N=6, 7, 8, 9 or 10. In an embodiment, choosing the N boundary points from all the boundary points may employ the average selection method. The average selection method may comprise: first counting the number S of all the boundary points, then selecting one boundary point every S/N boundary points starting from a boundary point, and finally sending the coordinates of the N boundary points to the matrix operation circuit 1.

In an embodiment, the camera apparatus may also comprise an infrared acquisition apparatus. Under the irradiation of infrared light, since the pupil and the iris have different absorptivities and reflectivities for the infrared light, the reflection effect of the pupil is very low and most of the infrared light will be absorbed, whereas the iris will almost completely reflect the infrared light, the pupil part will appear darker, the iris part will appear brighter, the difference between the two is obvious, and thereby the pupil may be easily detected. The gray-level conversion processing, filtering processing, binarization processing, boundary erosion and expansion and boundary extraction processing, etc., may be conducted employing algorithms well-known in the art, for example, the filtering processing may employ Gaussian filtering, the boundary extraction processing may employ the four-direction comparison method or the eight neighborhood method, and the like, which will not be repeated here any longer.

Figure 2:
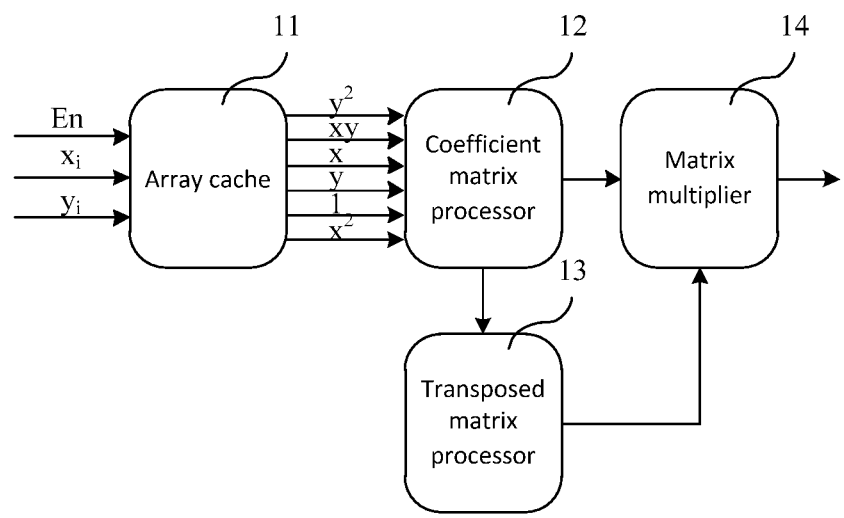
FIG. 2 is a structural diagram of a matrix operation circuit according to an embodiment of the disclosure.

FIG. 2 is a structural diagram of a matrix operation circuit according to an embodiment of the disclosure. The matrix operation circuit may be the matrix operation circuit 1 as shown in FIG. 1. As shown in FIG. 2, the matrix operation circuit based on hardware implementation may comprise an array cache 11, a coefficient matrix processor 12, a transposed matrix processor 13 and a matrix multiplier 14.

The array cache 11 may be coupled to the pupil area circuit at the front end and configured to receive the N boundary point coordinates ($x_i$ and $y_i$, wherein i is greater than or equal to 1 and less than or equal to N) outputted by the pupil area circuit and cache them in the form of an array. En as shown in FIG. 2 is for example an enabling signal.

The coefficient matrix processor 12 may be coupled to the array cache 11 and configured to successively read out the coordinate of each boundary point from the array cache 11 (wherein the abscissa of the i-th boundary point is $x_i$, and the ordinate of the i-th boundary point is $y_i$, i being greater than or equal to 1 and less than or equal to N) and obtain a set of linear over-determined equations $G1 \times X = H1$, wherein G1 is a first coefficient matrix of N×5, X is a variable matrix of 5×1, and H1 is a first constant term matrix of N×1.

The transposed matrix processor 13 may be coupled to the coefficient matrix processor 12 and configured to obtain a transposed matrix $G1^T$ of the first coefficient matrix G1.

The matrix multiplier 14 may be coupled to the coefficient matrix processor 12 and the transposed matrix processor 13 and configured to multiply the transposed matrix $G1^T$ with the first coefficient matrix G1 and the first constant term matrix H1, respectively, to obtain a set of linear normal equations $G2 \times X = H2$, wherein G2 is a second coefficient matrix of 5×5, and H2 is a second constant term matrix of 5×1, and the second coefficient matrix G2 and the second constant term matrix H2 are sent to the parameter operation circuit 2.

The working principle of the matrix operation circuit shown in FIG. 2 will be described in detail in connection with FIG. 4 later.

An embodiment of the disclosure performs pupil center positioning based on the ellipse fitting algorithm. In particular, utilizing N boundary sample points of the pupil area, ellipse fitting is performed on the N boundary sample points to find the pupil center. In the ellipse fitting algorithm, 5 sample points may uniquely determine an ellipse. However, when employing 5 sample points, since there are inevitably sample points with larger errors in the boundary sample points extracted by the pupil area circuit, the fitting error will be larger and cannot meet the accuracy requirement, if ellipse fitting is performed on all the sample points containing the sample points with larger errors. Therefore, according to an embodiment of the disclosure, N boundary sample points, N being greater than 5, are generally employed to form a set of linear over-determined equations, and then ellipse fitting is performed according to the least square method to obtain an elliptic equation. The least square method is a mathematical optimization technique, and it seeks the best function match for data by minimizing the sum of squares of errors. Utilization of the least square method may simply and conveniently obtain unknown data and minimize the sum of the squares of the errors between the obtained data and the actual data.

Figure 3:
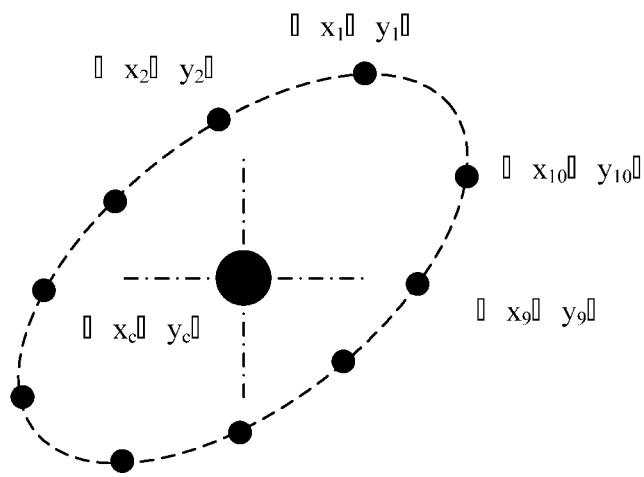
FIG. 3 is a schematic diagram of N boundary point coordinates of a pupil area according to an embodiment of the disclosure.

FIG. 3 is a schematic diagram of N boundary point coordinates of a pupil area according to an embodiment of the disclosure. FIG. 3 schematically shows 10 boundary points. $(x_1, y_1), (x_2, y_2), \ldots, (x_9, y_9), (x_{10}, y_{10})$ successively represent the abscissa and the ordinate of the first boundary point, the abscissa and the ordinate of the second boundary point, . . . , the abscissa and the ordinate of the ninth boundary point, and the abscissa and the ordinate of the tenth boundary point. $x_c$ and $y_c$ represent the abscissa and the ordinate of the pupil center, respectively.

In the following, the working principle of the matrix operation circuit shown in FIG. 2 will be described in detail in connection with FIG. 4.

First, the array cache 11 receives the N boundary point coordinates outputted by the pupil area circuit at the front end and caches them in the form of an array, wherein $x_i$ and $y_i$ are the abscissa and the ordinate of the i-th boundary point of the pupil area, respectively (in this example, i is greater than or equal to 1 and less than or equal to N).

According to an embodiment of the disclosure, in order to position the pupil center, it is necessary to establish an elliptic equation related with the pupil area. According to an embodiment of the disclosure, the elliptic equation obtained by ellipse fitting may be represented as $A+Bx+Cy+Dxy+Ex^2=y^2$, wherein x represents the abscissa of a point on the ellipse, and y represents the ordinate of the point on the ellipse. According to the disclosure, it may be possible to cause x, y to be known by obtaining boundary point coordinates of the pupil area and then determine the individual coefficients A, B, C, D, E.

Therefore, after the array cache 11 caches the N boundary point coordinates $(x_1, y_1), (x_2, y_2), \ldots, (X_{N-1}, Y_{N-1}), (x_N, y_N)$, for the i-th boundary point, the coefficient matrix processor 12 first successively reads out the abscissa $x_i$ and the ordinate $y_i$ of the i-th boundary point, obtains the values of $x_i y_i$, $x_i^2$, $y_i^2$ (as shown in FIG. 2, x, y, xy, $x^2$, $y^2$, 1) of the i-th boundary point by a multiplication operation, and then substitutes these values into the ellipse equation to obtain an equation, $A+x_i B+y_i C+x_i y_i D+x_i^2 E=y_i^2$. As such, the above operation is performed on the cached N boundary points successively, and a set of five-variable first-order linear over-determined equations may be obtained as follows:

$$A + x_1 B + y_1 C + x_1 y_1 D + x_1^2 E = y_1^2$$

$$A + x_2 B + y_2 C + x_2 y_2 D + x_2^2 E = y_2^2$$

$$\ldots$$

$$A + x_N B + y_N C + x_N y_N D + x_N^2 E = y_N^2$$

Over-determined equations refer to those in which the number of independent equations is greater than the number of independent unknown parameters. The matrix form of the above-described set of five-variable first-order linear over-determined equations is G1×X=H1, wherein X is a variable matrix of 5×1 and is a column vector constituted by 5 variables A, B, C, D, E, G1 is a first coefficient matrix of N×5 and is coefficients of the individual variables of the above-described set of over-determined equations, and H1 is a first constant term matrix of N×1 and is a column vector constituted by the constant terms to the right of the equal signs of the above-described set of over-determined equations.

The first coefficient matrix G1 is $$\begin{bmatrix} 1 & x_1 & y_1 & x_1 y_1 & x_1^2 \\ 1 & x_2 & y_2 & x_2 y_2 & x_2^2 \\ \vdots \\ 1 & x_N & y_N & x_N y_N & x_N^2 \end{bmatrix}$$

The first constant term matrix H1 is $$\begin{bmatrix} y_1^2 \\ y_2^2 \\ \vdots \\ y_N^2 \end{bmatrix}$$

The set of five-variable first-order linear over-determined equations is $$\begin{bmatrix} 1 & x_1 & y_1 & x_1 y_1 & x_1^2 \\ 1 & x_2 & y_2 & x_2 y_2 & x_2^2 \\ \vdots \\ 1 & x_N & y_N & x_N y_N & x_N^2 \end{bmatrix} \begin{bmatrix} A \\ B \\ C \\ D \\ E \end{bmatrix} = \begin{bmatrix} y_1^2 \\ y_2^2 \\ \vdots \\ y_N^2 \end{bmatrix}$$

After the coefficient matrix processor 12 obtains the first coefficient matrix G1 of N×5 and the first constant term matrix H1 of N×1, the transposed matrix processor 13 processes the first coefficient matrix G1 and obtains the transposed matrix $G1^T$ of the first coefficient matrix G1.

Figure 4:
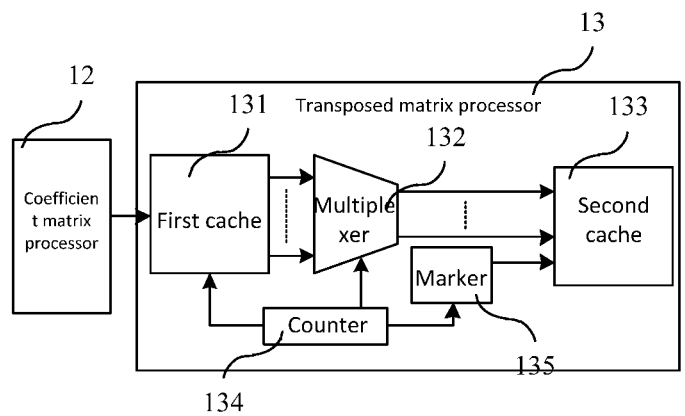
FIG. 4 is a structural diagram of a transposed matrix processor according to an embodiment of the disclosure.

FIG. 4 is a structural diagram of a transposed matrix processor according to an embodiment of the disclosure. The transposed matrix processor may be the transposed matrix processor 13 as shown in FIG. 2. As shown in FIG. 4, the transposed matrix processor 13 may comprise a first cache 131, a multiplexer 132, a second cache 133, a counter 134 and a marker 135. The first cache 131 is coupled to the coefficient matrix processor 12 and configured to obtain matrix elements of the first coefficient matrix G1 of N×5 from the coefficient matrix processor 12 and output them to the multiplexer 132. The multiplexer 132 is coupled to the first cache 131 and configured to obtain all the matrix elements from the first cache 131, interchange rows and columns for them and then output all the matrix elements to the second cache 133. The second cache 133 is coupled to the multiplexer 132 and configured to obtain all the matrix elements after the interchange of rows and columns from the multiplexer 132 to form the transposed matrix $G1^T$ of 5×N. Between the first cache 131 and the multiplexer 132 are N×5 channels for data input, and between the multiplexer 132 and the second cache 133 are 5×N channels for data output. The counter 134 is coupled to the first cache 131, the multiplexer 132 and the marker 135, respectively, and configured to increment a count in address mapping. The marker 135 is coupled to the counter 134 and the second cache 133, respectively, and configured to control individual matrix elements to be outputted to the second cache 133 according to the counter 134.

Turning to FIG. 2, after the transposed matrix processor 13 obtains the transposed matrix $G1^T$ of 5×N, the matrix multiplier 14 obtains the first coefficient matrix G1 and the first constant term matrix H1 from the coefficient matrix processor 12, obtains the transposed matrix $G1^T$ from the transposed matrix processor 13, multiplies the first coefficient matrix G1 with the transposed matrix $G1^T$ to obtain a second coefficient matrix G2 of 5×5, and multiplies the first constant term matrix H1 with the transposed matrix $G1^T$ to obtain a second constant term matrix H2 of 5×1. In an embodiment, the transposed matrix processor 13 may employ a structure of a random access memory (RAM), a multiplier and an adder, and be arranged with two address mapping RAMs, and in operation, the two RAMs successively give individual elements on which multiplication and addition operations are to be performed, for the multiplier and the adder to perform the multiplication and addition operations.

The processing of the matrix multiplier 14 is actually to multiply both sides of the set of five-variable first-order linear over-determined equations G1×X=H1 with the $G1^T$ to obtain a set of five-variable first-order linear normal equations whose matrix form is G2×X=H2, wherein X is a variable matrix of 5×1 and is a column vector constituted by 5 variables A, B, C, D, E, G2 is a second coefficient matrix of 5×5 and is coefficients of the individual variables of the set of linear normal equations, and H2 is a second constant term matrix of 5×1 and is a column vector constituted by the constant terms to the right of the equal signs of the set of linear normal equations.

After the matrix multiplier 14 obtains the second coefficient matrix G2 of 5×5 and the second constant term matrix H2 of 5×1, it sends all the matrix elements of the matrices to the parameter operation circuit 2.

The set of five-variable first-order linear normal equations is $$\begin{bmatrix} a_{11} & a_{12} & a_{13} & a_{14} & a_{15} \\ a_{21} & a_{22} & a_{23} & a_{24} & a_{25} \\ a_{31} & a_{32} & a_{31} & a_{34} & a_{35} \\ a_{41} & a_{42} & a_{43} & a_{44} & a_{45} \\ a_{51} & a_{52} & a_{53} & a_{54} & a_{55} \end{bmatrix} \begin{bmatrix} A \\ B \\ C \\ D \\ E \end{bmatrix} = \begin{bmatrix} b_1 \\ b_2 \\ b_3 \\ b_4 \\ b_5 \end{bmatrix}$$

Figure 5:
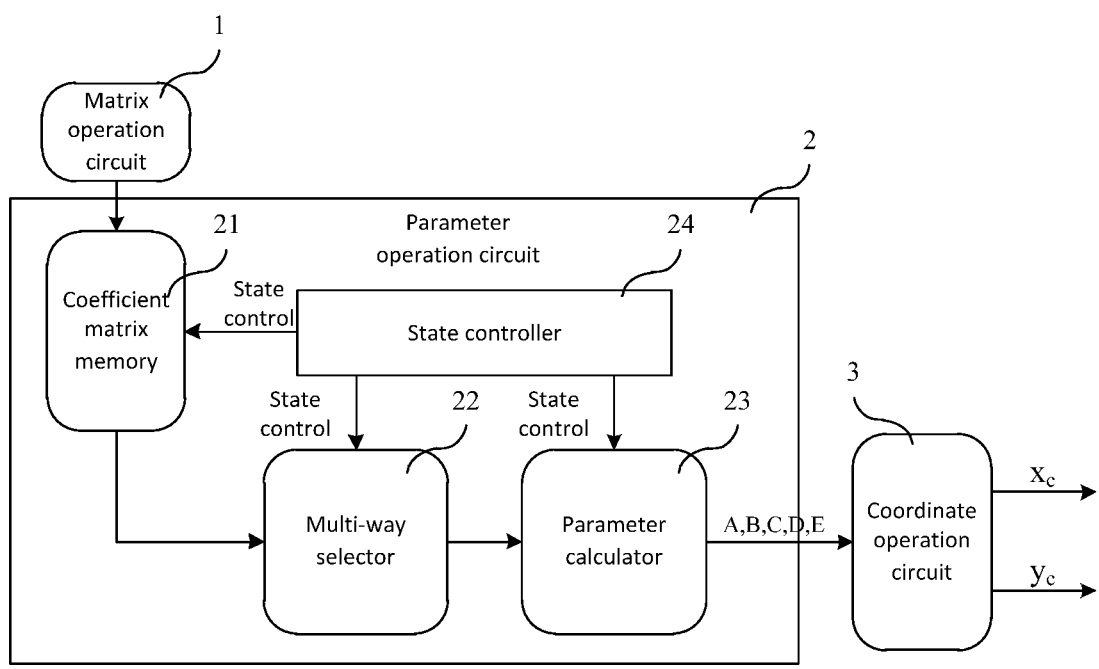
FIG. 5 is a structural diagram of a parameter operation circuit according to an embodiment of the disclosure.

FIG. 5 is a structural diagram of a parameter operation circuit according to an embodiment of the disclosure. The parameter operation circuit may be the parameter operation circuit 2 as shown in FIG. 1. As shown in FIG. 5, the parameter operation circuit based on hardware implementation may comprise a coefficient matrix memory 21, a multi-way selector 22, a parameter calculator 23 and a state controller 24.

The coefficient matrix memory 21 may be coupled to the matrix multiplier 14 in the matrix operation circuit 1 and configured to obtain the second coefficient matrix G2 and the second constant term matrix H2 from the matrix multiplier 14 and store all the matrix elements of the second coefficient matrix G2 and the second constant term matrix H2.

The multi-way selector 22 may be coupled to the coefficient matrix memory 21 and the state controller 24 and configured to successively obtain parameter matrices composed of the second coefficient matrix G2 and the second constant term matrix H2 from the coefficient matrix memory 21 according to the Cramer's Rule under the control of the state controller 24.

The parameter calculator 23 may be coupled to the multi-way selector 22 and the state controller 24 and configured to calculate the product of each of the parameter matrices and the second coefficient matrix G2 under the control of the state controller 24, obtain each parameter of the elliptic equation, and send the parameter to the coordinate operation circuit 3.

The state controller 24 may be coupled to the coefficient matrix memory 21, the multi-way selector 22 and the parameter calculator 23, and configured to uniformly control the coefficient matrix memory 21, the multi-way selector 22 and the parameter calculator 23.

The Cramer's Rule is a theorem on solving a set of linear equations in linear algebra and suitable for a set of linear equations in which the number of variables is equal to that of the equations. According to the Cramer's Rule, when the second coefficient matrix G2 is reversible, or the corresponding determinant |G2| is not equal to 0, it has a unique solution Xi=|G2i|/|G2, wherein G2i (i=1, 2, 3, 4, 5) is a parameter matrix obtained by replacing $a_{1i}$, $a_{2i}$, $a_{3i}$, $a_{4i}$, as, of the i-th column in the second coefficient matrix G2 with $b_1$, $b_2$, $b_3$, $b_4$, $b_5$ successively. In particular, the multi-way selector 22 obtains the parameter matrix G2i under the control of the state controller 24, respectively, and the parameter calculator 23 performs calculation of |G2i|/|G2| under the control of the state controller 24, respectively, to obtain the values of the five variables of the set of linear normal equations, wherein $$A = \frac{\begin{bmatrix} b_1 & a_{12} & a_{13} & a_{14} & a_{15} \\ b_2 & a_{22} & a_{23} & a_{24} & a_{25} \\ b_3 & a_{32} & a_{33} & a_{34} & a_{35} \\ b_4 & a_{42} & a_{43} & a_{44} & a_{45} \\ b_5 & a_{52} & a_{53} & a_{54} & a_{55} \end{bmatrix}}{\begin{bmatrix} a_{11} & a_{12} & a_{13} & a_{14} & a_{15} \\ a_{21} & a_{22} & a_{23} & a_{24} & a_{25} \\ a_{31} & a_{32} & a_{31} & a_{34} & a_{35} \\ a_{41} & a_{42} & a_{43} & a_{44} & a_{45} \\ a_{51} & a_{52} & a_{53} & a_{54} & a_{55} \end{bmatrix}}$$

$$B = \frac{\begin{bmatrix} a_{11} & b_1 & a_{13} & a_{14} & a_{15} \\ a_{21} & b_2 & a_{23} & a_{24} & a_{25} \\ a_{31} & b_3 & a_{33} & a_{34} & a_{35} \\ a_{41} & b_4 & a_{43} & a_{44} & a_{45} \\ a_{51} & b_5 & a_{53} & a_{54} & a_{55} \end{bmatrix}}{\begin{bmatrix} a_{11} & a_{12} & a_{13} & a_{14} & a_{15} \\ a_{21} & a_{22} & a_{23} & a_{24} & a_{25} \\ a_{31} & a_{32} & a_{31} & a_{34} & a_{35} \\ a_{41} & a_{42} & a_{43} & a_{44} & a_{45} \\ a_{51} & a_{52} & a_{53} & a_{54} & a_{55} \end{bmatrix}}$$

$$C = \frac{\begin{bmatrix} a_{11} & a_{12} & b_1 & a_{14} & a_{15} \\ a_{21} & a_{22} & b_2 & a_{24} & a_{25} \\ a_{31} & a_{32} & b_3 & a_{34} & a_{35} \\ a_{41} & a_{42} & b_4 & a_{44} & a_{45} \\ a_{51} & a_{52} & b_5 & a_{54} & a_{55} \end{bmatrix}}{\begin{bmatrix} a_{11} & a_{12} & a_{13} & a_{14} & a_{15} \\ a_{21} & a_{22} & a_{23} & a_{24} & a_{25} \\ a_{31} & a_{32} & a_{31} & a_{34} & a_{35} \\ a_{41} & a_{42} & a_{43} & a_{44} & a_{45} \\ a_{51} & a_{52} & a_{53} & a_{54} & a_{55} \end{bmatrix}}$$

$$D = \frac{\begin{bmatrix} a_{11} & a_{12} & a_{13} & b_1 & a_{15} \\ a_{21} & a_{22} & a_{23} & b_2 & a_{25} \\ a_{31} & a_{32} & a_{33} & b_3 & a_{35} \\ a_{41} & a_{42} & a_{43} & b_4 & a_{45} \\ a_{51} & a_{52} & a_{52} & b_5 & a_{55} \end{bmatrix}}{\begin{bmatrix} a_{11} & a_{12} & a_{13} & a_{14} & a_{15} \\ a_{21} & a_{22} & a_{23} & a_{24} & a_{25} \\ a_{31} & a_{32} & a_{31} & a_{34} & a_{35} \\ a_{41} & a_{42} & a_{43} & a_{44} & a_{45} \\ a_{51} & a_{52} & a_{53} & a_{54} & a_{55} \end{bmatrix}}$$

$$E = \frac{\begin{bmatrix} a_{11} & a_{12} & a_{13} & a_{14} & b_1 \\ a_{21} & a_{22} & a_{23} & a_{24} & b_2 \\ a_{31} & a_{32} & a_{33} & a_{34} & b_3 \\ a_{41} & a_{42} & a_{43} & a_{44} & b_4 \\ a_{51} & a_{52} & a_{52} & a_{54} & b_5 \end{bmatrix}}{\begin{bmatrix} a_{11} & a_{12} & a_{13} & a_{14} & a_{15} \\ a_{21} & a_{22} & a_{23} & a_{24} & a_{25} \\ a_{31} & a_{32} & a_{31} & a_{34} & a_{35} \\ a_{41} & a_{42} & a_{43} & a_{44} & a_{45} \\ a_{51} & a_{52} & a_{53} & a_{54} & a_{55} \end{bmatrix}}$$

In addition, it may also be possible to directly work out the values of the five variables of the set of linear normal equations according to the definition of the determinant, that is, the values of the five parameters A, B, C, D, E of the elliptic equation. Since this calculation is a well-known technique in the art, it will not be repeated here any longer.

After obtaining the parameters of the elliptic equation, the parameter calculator 23 sends these parameters to the coordinate operation circuit 3, and utilizing the five parameters A, B, C, D, E, the coordinate operation circuit 3 may calculate the ultimate pupil center coordinate $(x_c, y_c)$ through ellipse center calculation formulae.

The ellipse center calculation formulae are as follows:

$$x_c = \frac{CD + 2B}{-4E - D^2}$$

$$y_c = \frac{BD - 2CE}{-4E - D^2}$$

wherein $x_c$ and $y_c$ are the abscissa and the ordinate of the ellipse center, respectively, and A, B, C, D, E are the parameters of the elliptic equation.

In the technologies known to the inventors, the LU decomposition method is commonly used for parameter calculation, however, a drawback exists that error accumulation occurs when division calculation is performed, and the calculation accuracy is low. In contrast, the embodiment of the disclosure adopts the Cramer's Rule for parameter calculation, effectively avoids the error accumulation, improves the calculation accuracy, and meanwhile, also has the advantages that the processing speed is high, the processing time is short, use of logic resources is little, and the like, and provides a good basis for subsequent processing to improve the processing speed and reduce the processing time.

In an embodiment, the matrix operation circuit, the parameter operation circuit and the coordinate operation circuit of an embodiment of the disclosure may all be implemented employing a hardware circuit constituted by a RAM read/write controller, a comparator, a counter, a multiplier, an adder and other devices, or also may be implemented by employing an approach combining FPGA. The circuit structure and the code may be directly applied in IC customization, and facilitate integration in a virtual reality device, especially a head-mounted virtual reality device. When it is implemented by employing an approach combining FPGA (e.g., implemented on Xilinx FPGA), operations involved in a design procedure such as the multiplication operation, the division operation, the accumulation operation and the data storage are all written autonomously, and it is unnecessary to invoke existing IP cores in FPGA such as the multiplier, the divider, the accumulator and the memory, etc., that is, it is unnecessary to invoke any Xilinx IP module in the design procedure.

An implementation of the matrix operation circuit, the parameter operation circuit and the coordinate operation circuit in the embodiments of the disclosure has been described above, and it may be appreciated by the person having ordinary skills in the art that it may further be possible to employ a general logic operation processing circuit, for example, a central processing unit (CPU), a micro controller unit (MCU), etc., to perform the algorithm of the pupil center positioning method provided by the embodiments of the disclosure to implement the above circuits; and it may further be possible to embed the algorithm of the pupil center positioning method provided by the embodiments of the disclosure in an application-specific integrated circuit (ASIC) to implement the above circuits.

Figure 6:
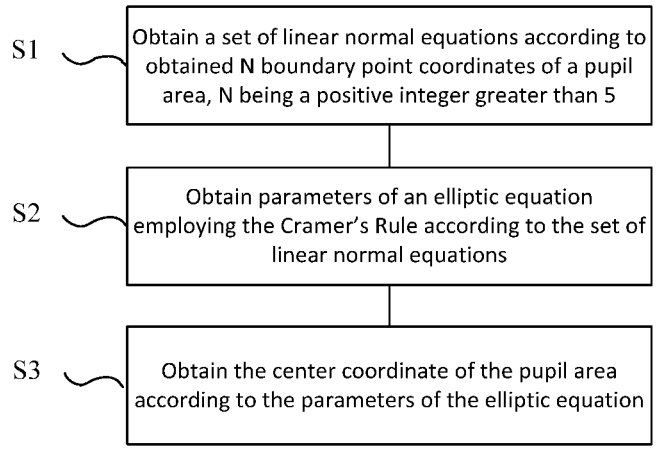
FIG. 6 is a flow chart of a pupil center positioning method according to an embodiment of the disclosure.

Based on the foregoing inventive concepts, an embodiment of the disclosure further provides a pupil center positioning method based on hardware implementation. FIG. 6 is a flow chart of a pupil center positioning method according to an embodiment of the disclosure. As shown in FIG. 6, the pupil center positioning method may comprise:

S1, obtaining a set of linear normal equations according to received N boundary point coordinates of a pupil area, N being a positive integer greater than 5;

S2, obtaining parameters of an elliptic equation employing the Cramer's Rule according to the set of linear normal equations; and S3, obtaining the center coordinate of the pupil area according to the parameters of the elliptic equation.

The pupil center positioning method based on hardware implementation provided by the embodiment of the disclosure carries out pupil center positioning based on an ellipse fitting algorithm, and, as compared to the projection coordinate method, the embodiment of the disclosure not only increases the calculation accuracy and improves the anti-interference ability, but also facilitates hardware implementation and is integrated into a virtual reality device, its processing speed is higher, its processing time is shorter, and it uses less logic resources. In processing the multiple boundary points of the pupil area, the Cramer's Rule is employed to obtain the parameters of the elliptic equation, and as compared to the LU Decomposition, the embodiment of the disclosure may effectively avoid error accumulation occurring in division calculation in the LU Decomposition, and further improve the calculation accuracy and the anti-interference ability.

In an embodiment, the step S1 may comprise:

S11, receiving the N boundary point coordinates outputted by the front end and caching them in the form of an array;

S12, successively reading out the abscissa and the ordinate of each boundary point and obtaining a set of linear over-determined equations G1×X=H1, wherein G1 is a first coefficient matrix of N×5, X is a variable matrix of 5×1, and H1 is a first constant term matrix of N×1;

S13, obtaining a transposed matrix $G1^T$ of the first coefficient matrix; and

S14, multiplying the transposed matrix $G1^T$ with the first coefficient matrix G1 and the first constant term matrix H1, respectively, to obtain a set of linear normal equations G2×X=H2, wherein G2 is a second coefficient matrix of 5×5, and H2 is a second constant term matrix of 5×1.

The step S2 may comprise:

S21, storing the matrix elements of the second coefficient matrix G2 and the second constant term matrix H2;

S22, successively obtaining parameter matrices composed of the second coefficient matrix G2 and the second constant term matrix H2 according to the Cramer's Rule; and S23, calculating the product of each of the parameter matrices and the second coefficient matrix G2 and obtaining the parameters of the elliptic equation.

The step 3 may comprise:

S31, obtaining the parameters of the elliptic equation; and

S32, calculating the pupil center coordinate by the ellipse center calculation formulae according to the parameters of the elliptic equation.

The processing flows of obtaining the set of over-determined equations, the transposed matrix, the set of linear normal equations, the parameter matrix, the parameters and the pupil center coordinate, etc., may refer to the content of the pupil center positioning apparatus, and will not be repeated here any longer.

Based on the foregoing technical concepts, an embodiment of the disclosure further provides a virtual reality device comprising a pupil center positioning apparatus as described above.

Figure 7:
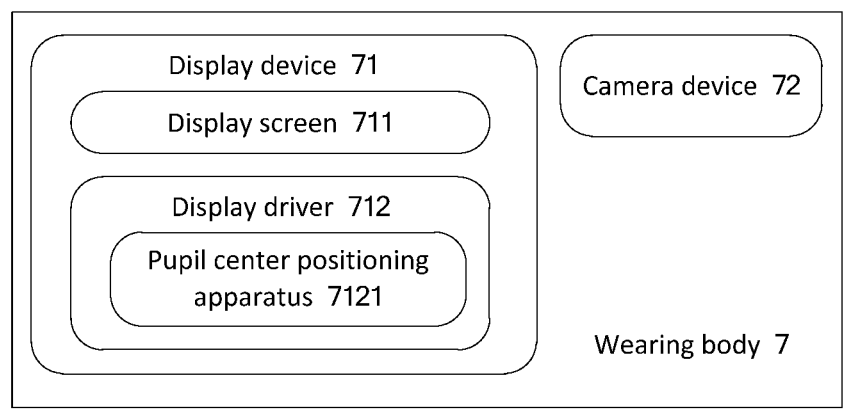
FIG. 7 is a virtual reality device according to an embodiment of the disclosure.

FIG. 7 is a structural diagram of a virtual reality device according to an embodiment of the disclosure. As shown in FIG. 7, a main structure of the virtual reality device may comprise a wearing body 7. Inside the wearing body 7 are arranged a display device 71 and a camera device 72. The display device 71 may comprise one or more display screen 711 and a display driver 712. In an embodiment of the disclosure, a pupil center positioning apparatus 7121 is integrated into the display driver 712. The pupil center positioning apparatus 7121 may be one as shown in FIG. 1. The camera device 72 acquires an eye image of a user, and sends the eye image to the pupil center positioning apparatus 7121, and after the pupil center positioning apparatus 7121 obtains the pupil center coordinate, it calculates the position of the current line-of-sight of the user's eye which falls on the display screen in combination with the coordinate of the spot, and then operates the display screen, implementing a function such as human-machine interaction or gaze point rendering, etc.

In the description of the embodiments of the disclosure, it is appreciated that, the orientation or position relationship indicated by the terms "middle", "on", "below", "front", "rear", "vertical", "horizontal", "top", "bottom", "inside" and "outside", etc. is an orientation or position relationship based on what is shown in the drawings, it is only for the convenience of describing the disclosure and simplifying the description, but does not indicate or imply that the apparatus or element referred to must have a specific orientation, and be constructed and operated in a specific orientation, and therefore cannot be understood as limiting the disclosure.

In the description of the embodiments of the disclosure, it is noted that, unless definitely prescribed and defined otherwise, the terms "install", "join", "connect" should be understood in a broad sense, for example, it may be a fixed connection, or also may be a removable connection, or connected integrally; it may be a mechanical connection, or also may be an electrical connection; it may be connected directly, or also may be connected indirectly by an intermediate medium, or may be internal communication between two elements. For the person having ordinary skills in the art, the specific meaning of the above terms in the disclosure may be understood according to the specific circumstances.

It should be appreciated by the person having ordinary skills in the art that the embodiments of the disclosure may be provided as a method, a system or a computer program product. Therefore, the disclosure may take the form of entire hardware embodiments, entire software embodiments, or embodiments combining software and hardware aspects.

Although the embodiments disclosed by the disclosure are as above, what is described is just embodiments employed for the convenience of understanding the disclosure, and is not used to limit the disclosure. Any person having skills in the art the disclosure belongs to may make any modifications and changes to the embodied forms and details without departing from the spirit disclosed by and the scope of the disclosure. However, the patent protection scope of the disclosure should still be subject to the scope defined by the appended claims.

What is claimed is:

1. A pupil center positioning apparatus comprising:
a matrix operation circuit configured to obtain a set of linear normal equations according to received N boundary point coordinates of a pupil area, N being a positive integer greater than 5;
a parameter operation circuit configured to obtain parameters of an elliptic equation employing the Cramer's Rule according to the set of linear normal equations; and
a coordinate operation circuit configured to obtain the center coordinate of the pupil area according to the parameters of the elliptic equation;
wherein the matrix operation circuit comprises:
an array cache configured to receive the N boundary point coordinates and cache them in the form of an array;
a coefficient matrix processor configured to successively read out the coordinate of each boundary point from the array cache and obtain a set of linear over-determined equations $G1 \times X = H1$, wherein G1 is a first coefficient matrix of $N \times 5$, X is a variable matrix of $5 \times 1$, and H1 is a first constant term matrix of $N \times 1$;
a transposed matrix processor configured to obtain a transposed matrix $G1^T$ of the first coefficient matrix G1; and
a matrix multiplier configured to multiply the transposed matrix $G1^T$ with the first coefficient matrix G1 and the first constant term matrix H1, respectively, to obtain a set of linear normal equations $G2 \times X = H2$, wherein G2 is a second coefficient matrix of $5 \times 5$, and H2 is a second constant term matrix of $5 \times 1$.

2. The pupil center positioning apparatus as claimed in claim 1, wherein the transposed matrix processor comprises:
a first cache configured to obtain matrix elements of the first coefficient matrix G1 from the coefficient matrix processor;
a multiplexer configured to obtain all the matrix elements from the first cache and interchange rows and columns for them;
a second cache configured to obtain all the matrix elements after the interchange of rows and columns from the multiplexer to form the transposed matrix $G1^T$;
a counter coupled to the first cache, the multiplexer and a marker, respectively, and configured to increment a count in address mapping; and
the marker coupled to the counter and the second cache, respectively, and configured to control individual matrix elements to be outputted to the second cache according to the counter.

3. The pupil center positioning apparatus as claimed in claim 2, wherein N=10.

4. The pupil center positioning apparatus as claimed in claim 1, wherein the parameter operation circuit comprises:
- a state controller coupled to a coefficient matrix memory, a multi-way selector and a parameter calculator, respectively;
- the coefficient matrix memory configured to obtain the second coefficient matrix G2 and the second constant term matrix H2 from the matrix operation circuit and store all the matrix elements of the second coefficient matrix G2 and the second constant term matrix H2;
- the multi-way selector configured to successively obtain parameter matrices composed of the second coefficient matrix G2 and the second constant term matrix H2 from the coefficient matrix memory according to the Cramer's Rule under the control of the state controller; and
- the parameter calculator configured to calculate the product of each of the parameter matrices and the second coefficient matrix G2 under the control of the state controller and obtain each parameter of the elliptic equation.

5. The pupil center positioning apparatus as claimed in claim 4, wherein N=10.

6. The pupil center positioning apparatus as claimed in claim 1, wherein N=10.

7. The pupil center positioning apparatus as claimed in claim 6, wherein N=10.

8. A virtual reality device comprising a pupil center positioning apparatus as claimed in claim 1.

9. The pupil center positioning apparatus as claimed in claim 1, wherein N=10.

10. A virtual reality device comprising a pupil center positioning apparatus as claimed in claim 1, wherein the parameter operation circuit comprises:
- a state controller coupled to a coefficient matrix memory, a multi-way selector and a parameter calculator, respectively;
- the coefficient matrix memory configured to obtain the second coefficient matrix G2 and the second constant term matrix H2 from the matrix operation circuit and store all the matrix elements of the second coefficient matrix G2 and the second constant term matrix H2;
- the multi-way selector configured to successively obtain parameter matrices composed of the second coefficient matrix G2 and the second constant term matrix H2 from the coefficient matrix memory according to the Cramer's Rule under the control of the state controller; and
- the parameter calculator configured to calculate the product of each of the parameter matrices and the second coefficient matrix G2 under the control of the state controller and obtain each parameter of the elliptic equation.

11. A virtual reality device comprising a pupil center positioning apparatus as claimed in claim 1, wherein N=10.

12. A pupil center positioning method implemented by a pupil center positioning apparatus, the pupil center positioning apparatus comprising a matrix operation circuit, a parameter operation circuit, a coordinate operation circuit, and the method comprising:
- obtaining, by a matrix operation circuit, a set of linear normal equations according to received N boundary point coordinates of a pupil area, N being a positive integer greater than 5;
- obtaining, by a parameter operation circuit, parameters of an elliptic equation employing the Cramer's Rule according to the set of linear normal equations; and
- obtaining, by a coordinate operation circuit, the center coordinate of the pupil area according to the parameters of the elliptic equation;
- wherein the matrix operation circuit comprises an array cache, a coefficient matrix processor, a transposed matrix, and a matrix multiplier; and wherein the obtaining, by a matrix operation circuit, a set of linear normal equations according to received N boundary point coordinates of a pupil area comprises:
- receiving the N boundary point coordinates and caching them in the form of an array, by an array cache;
- successively reading out, by a coefficient matrix processor, the coordinate of each boundary point to obtain a set of linear over-determined equations G1×X=H1, wherein G1 is a first coefficient matrix of N×5, X is a variable matrix of 5×1, and H1 is a first constant term matrix of N×1;
- obtaining, by a transposed matrix processor, a transposed matrix $G1^T$ of the first coefficient matrix; and
- multiplying, by a matrix multiplier, the transposed matrix $G1^T$ with the first coefficient matrix G1 and the first constant term matrix H1, respectively, to obtain a set of linear normal equations G2×X=H2, wherein G2 is a second coefficient matrix of 5×5, and H2 is a second constant term matrix of 5×1.

13. The pupil center positioning method as claimed in claim 12,
wherein the parameter operation circuit comprises a coefficient matrix memory, a multi-way selector and a parameter calculator; and wherein the obtaining, by a parameter operation circuit, parameters of an elliptic equation employing the Cramer's Rule according to the set of linear normal equations comprises:
- storing, by a coefficient matrix memory, the matrix elements of the second coefficient matrix G2 and the second constant term matrix H2;
- successively obtaining, by a multi-way selector, parameter matrices composed of the second coefficient matrix G2 and the second constant term matrix H2 according to the Cramer's Rule; and
- calculating, by a parameter calculator, the product of each of the parameter matrices and the second coefficient matrix G2 to obtain the parameters of the elliptic equation.

14. The pupil center positioning method as claimed in claim 12, wherein N=10.

* * * * *